United States Patent [19]

Deichmann et al.

[11] Patent Number: 4,625,854

[45] Date of Patent: Dec. 2, 1986

[54] CONTAINER TRANSFER SYSTEM

[75] Inventors: Helmut Deichmann, Seven Hills; Thomas J. Zeeff, Cleveland, both of Ohio

[73] Assignee: Feco Engineered Systems, Inc., Cleveland, Ohio

[21] Appl. No.: 647,297

[22] Filed: Sep. 4, 1984

[51] Int. Cl.⁴ .................. B65G 47/04; B65G 47/24; B65G 49/00

[52] U.S. Cl. .................. 198/416; 198/470.1; 198/476.1

[58] Field of Search ............. 198/416, 478, 479, 695, 198/653, 406, 417, 482, 655, 470.1, 476.1

[56] References Cited

U.S. PATENT DOCUMENTS

| | | | |
|---|---|---|---|
| 1,574,430 | 2/1926 | Lemon | 198/417 |
| 2,432,024 | 12/1947 | Lipton | 198/479 |
| 2,770,347 | 11/1956 | Porterfield | 198/470.1 |
| 2,888,127 | 5/1959 | Uhlig | 198/653 |
| 3,115,091 | 12/1963 | Hakogi | 198/476.1 |
| 3,133,496 | 5/1964 | Dubuit | 198/655 |
| 3,469,670 | 9/1969 | Cartwright | 198/478 |
| 3,938,847 | 2/1976 | Peyton | 198/479 |
| 3,944,058 | 3/1976 | Strauss | 198/470.1 |
| 4,116,325 | 9/1978 | McDonald | 198/484 |
| 4,168,773 | 9/1979 | Thiel et al. | 198/470.1 |

FOREIGN PATENT DOCUMENTS 527029  5/1955  Italy .................................. 198/406

Primary Examiner—Joseph E. Valenza
Assistant Examiner—Daniel R. Alexander
Attorney, Agent, or Firm—Patrick J. Walsh

[57] ABSTRACT

A container transfer system in which containers such as plastic bottles having been newly formed are brought to a transfer conveyor in upright condition, reoriented to a horizontal position along a transfer conveyor and are engaged by their necks by carrier members on a carrier conveyor, removed from the transfer conveyor, and carried to subsequent container operations with substantially the entire exterior surface of the container exposed for subsequent operations such as coating or decorating.

10 Claims, 8 Drawing Figures

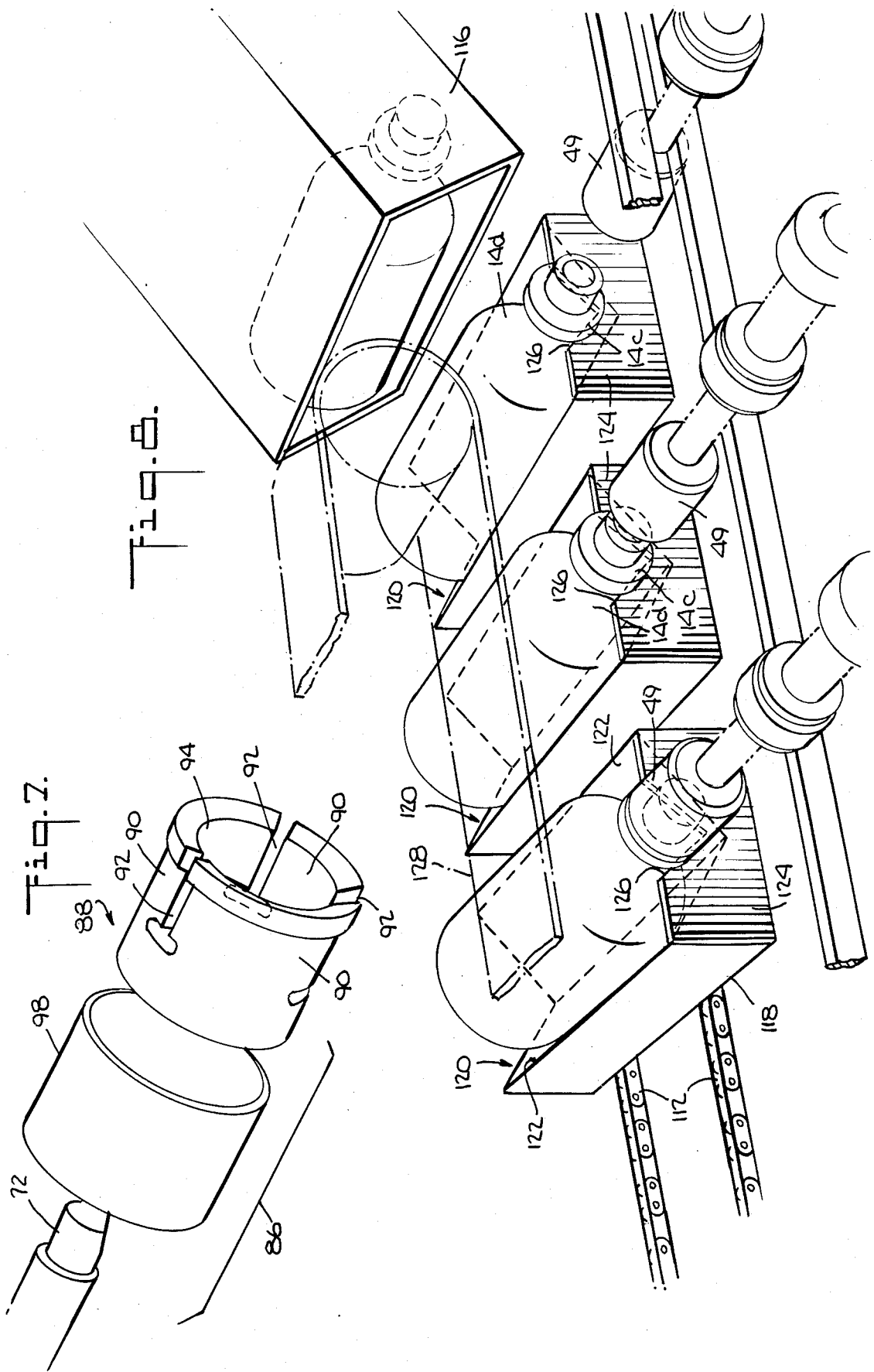

CONTAINER TRANSFER SYSTEM

BACKGROUND OF THE INVENTION

Soft drinks such as carbonated sodas are now commonly packaged in plastic containers known as PET containers for sale to retail consumers. Additionally, other plastic containers are being used or being developed for packaging beer, salad dressing, and other foods, and for packaging cosmetics, pharmaceuticals, and other items.

These plastic containers undergo a number of different operations in a container and/or filling plant including formation, washing, applying and curing barrier coating, labelling, and filling.

The present invention is directed to a system for handling plastic containers and for moving them through various operational steps in a fast and efficient manner.

SUMMARY OF THE INVENTION

The system, according to the present invention, includes an infeed conveyor for delivering newly formed, uncoated plastic containers in a single file to a handling and conveying system. In a preferred embodiment of the invention, the containers are received by a flighted transfer conveyor in upright condition. The transfer conveyor will reorient the container to a substantially horizontal position moving in timed and spaced relationship to a series of carrier mechanisms on a carrier conveyor.

A carrier conveyor is positioned adjacent the transfer conveyor for collecting the horizontally oriented containers and carrying them through a series of finishing operations. The carrier conveyor includes an endless conveying member in the form of an endless chain suitably mounted and driven. A series of container carrier mechanisms are fitted to the carrier chain for movement in timed and spaced relationship to containers on the transfer conveyor. The carrier mechanisms advance toward and grip each container at its neck removing it from the transfer conveyor and moving the containers to subsequent finishing operations. By this manner of carriage the entire container below its neck ring is exposed for coating, labelling, printing and so forth.

In a typical finishing operation, the moving carrier mechanisms position the containers within a coating chamber, rotate the containers within the coating chamber to assure full and uniform coating of the containers and to provide sufficient rotational movement so that the coating does not sag or dip but is evenly distributed, and thereafter move the containers into and through a curing oven. Copending application Ser. No. 666,741, filed Oct. 31, 1984 discloses a method and apparatus for applying and curing coatings of plastic containers.

In cases where one or more carrier mechanisms has not received a container, an arrangement is made to direct that mechanism along a separate path so that it does not become involved in subsequent finishing operations such as coating, since the mechanism without the container would be covered with coating thereby fouling the gripping head.

OBJECTS OF THE INVENTION

It is an object of the present invention to provide a container handling system for moving containers, particularly plastic containers through a series of container or filling operations such as applying an exterior barrier coating to the containers and thereafter curing the coating such that the container is ready to receive consumer products such as carbonated soda, ketchup, and so forth.

A further object of the present invention is to provide a novel mechanism for receiving, holding, rotating, and moving each container as it moves through a series of finishing operations.

It is a further object to provide an arrangement so that any carrier mechanism not receiving a container will travel a separate path than those receiving containers.

A further object is to provide a transfer mechanism for gripping each container by its neck so that the entire exterior surface of the container is free to receive such operational measures as barrier coating, inspection, labelling, and printing.

Other and further objects will become apparent to those skilled in the art upon an understanding of the specification hereof, or will occur upon employment of the invention in practice.

DESCRIPTION OF THE DRAWING

A preferred embodiment of the invention has been chosen for purposes of illustration and is shown in the accompanying drawing of which:

FIG. 7 is an exploded perspective view of a carrier gripping head used to grip containers for movement by a carrier conveyor.

FIG. 8 is a perspective view of a modified embodiment showing the feeding of cylindrical containers to a transfer conveyor for collection by the carrier conveyor.

DETAILED DESCRIPTION OF THE INVENTION

Figure 1:
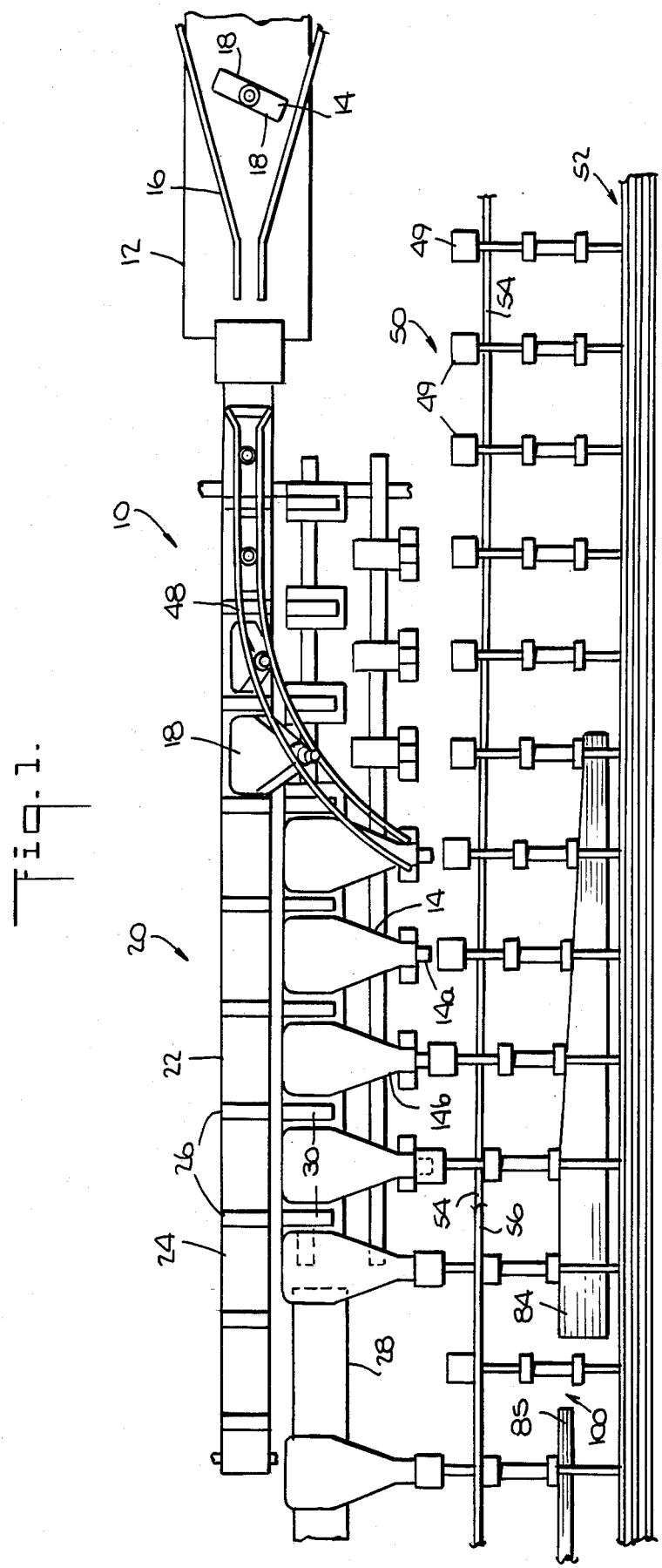
FIG. 1 is a fragmentary plan view showing the infeed conveyor, the transfer conveyor, and the carrier mechanism conveyor.

Referring now to FIG. 1, the container transfer system 10 includes an in-feed conveyor 12 for moving flat-sided containers 14 through an orienting chute 16 where they are oriented to a position with sidewalls 18 substantially parallel to the direction of conveyance. For other containers having cylindrical bodies, a different sort of chute as shown in FIG. 8 would be used sufficient to single file the containers for delivery to a transfer conveyor. The transfer conveyor 20 (FIG. 1) includes an entry conveyor 22 comprising an endless flighted conveying belt 24 for receiving individual containers in position between subsequent flights defined by sidewall members 26 evenly spaced along the conveying surface. The transfer conveyor also includes a body support conveyor 28 which is flighted, and has upstanding divider members 30 for supporting and positioning containers after they have been reoriented from the vertical to horizontal positions. Typically each flight will include spaced divider means 30 and an intermediate flat member 32 on which the container now rests in a horizontal position. The shape and arrangement of these flighted conveyor members are suitable for the container configuration illustrated in FIGS. 1–5. It is to be understood that the configuration of the transfer conveyor flight sections may be modified as desired to conform with different container configurations including cylindrical containers as shown in FIG. 8.

The transfer conveyor also includes a container neck support and positioning conveyor 34 including a series of supporting cradles 36 having wing shaped cradle members 38 for engaging and supporting the neck of each container. The neck cradles 38 are aligned centrally of the body supporting segments 32 and cooperate therewith to provide adequate support and proper positioning of each container on the transfer conveyor. See particularly FIGS. 4 and 5.

Figure 2:
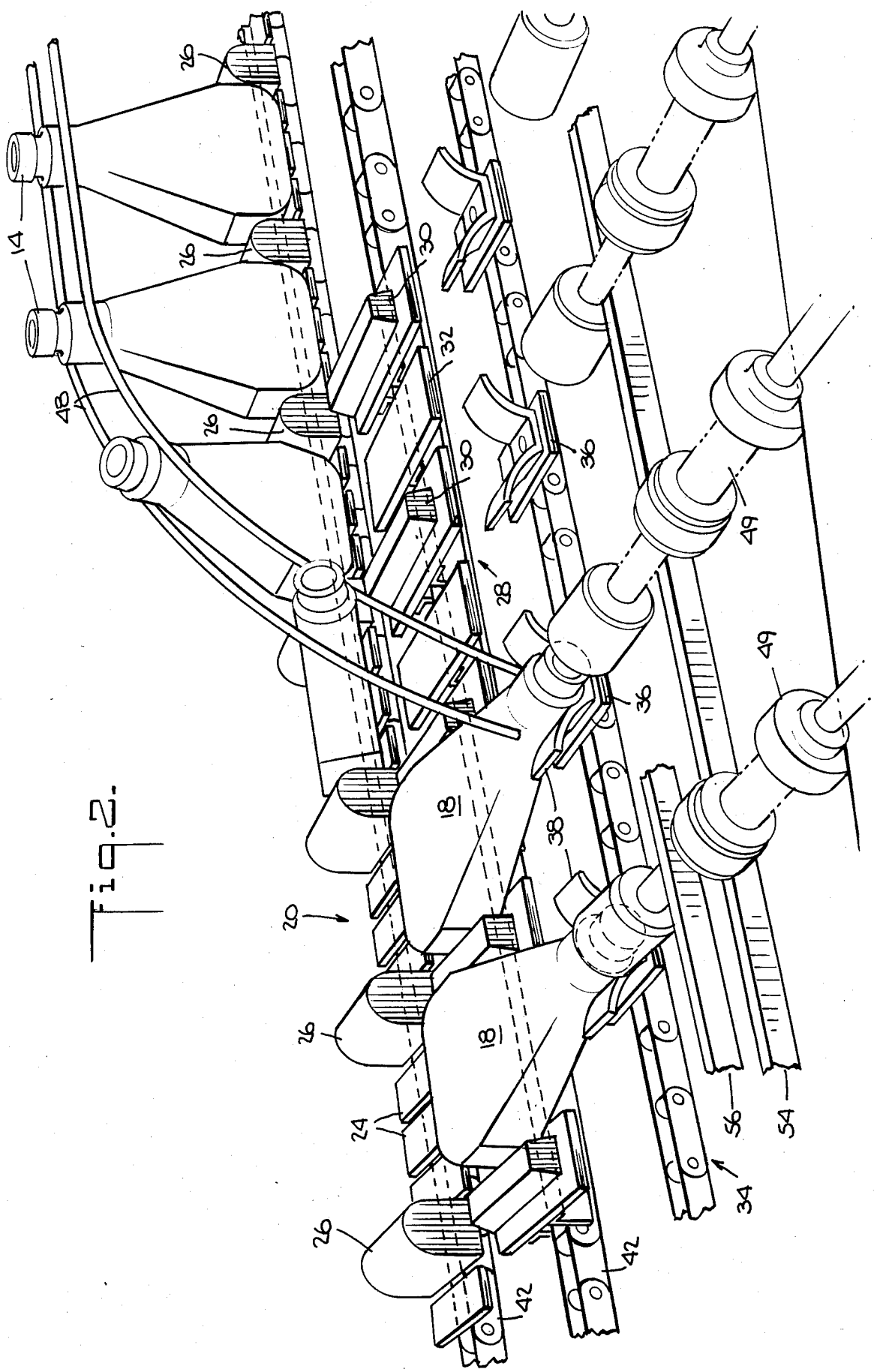
FIG. 2 is a perspective view corresponding to FIG. 1 showing the containers being reoriented from the vertical to the horizontal and showing in sequence the action of loading containers onto the carrier mechanism.
Figure 3:
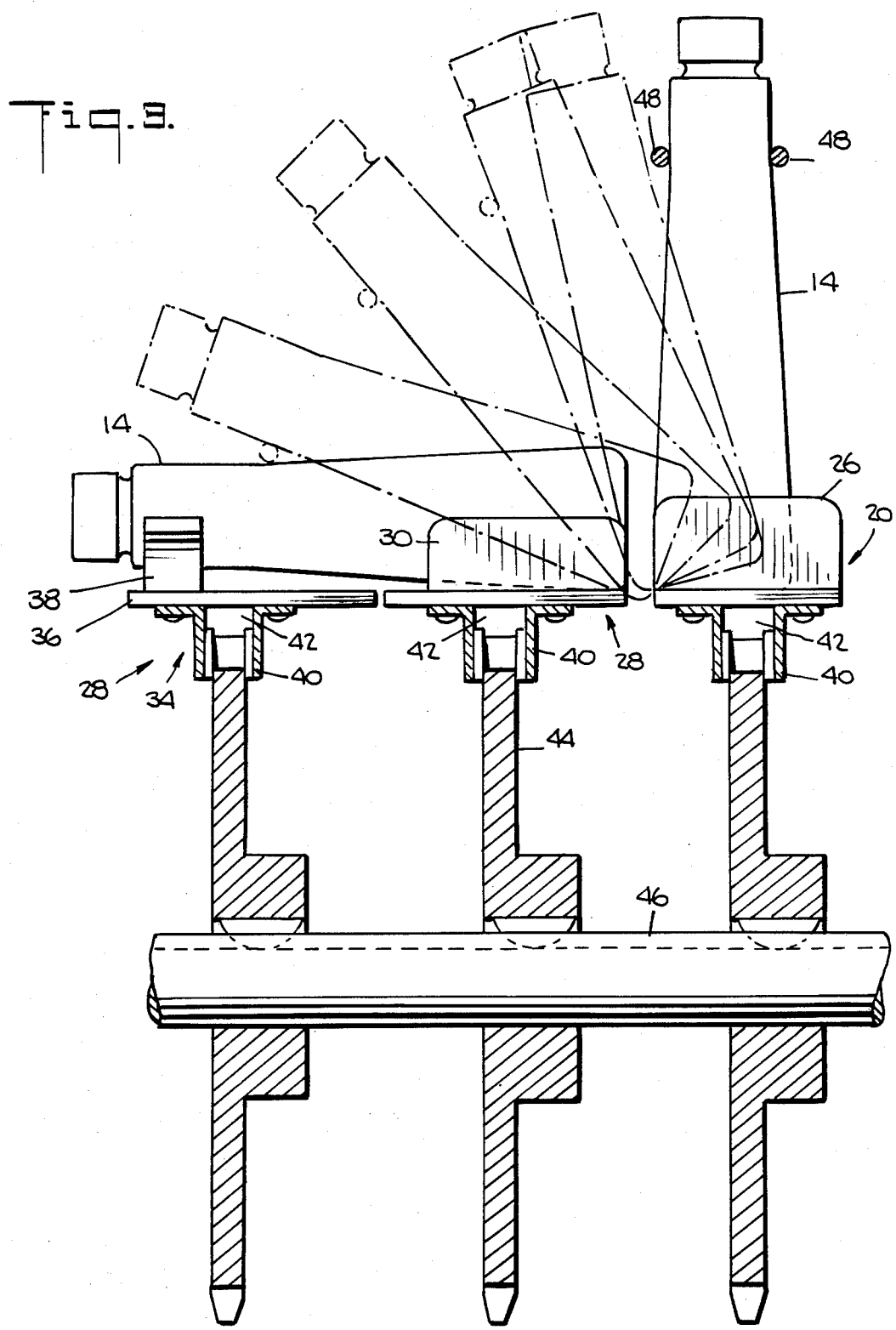
FIG. 3 is an end view showing movement and support of the container as it moves from vertical to horizontal orientation.
Figure 4:
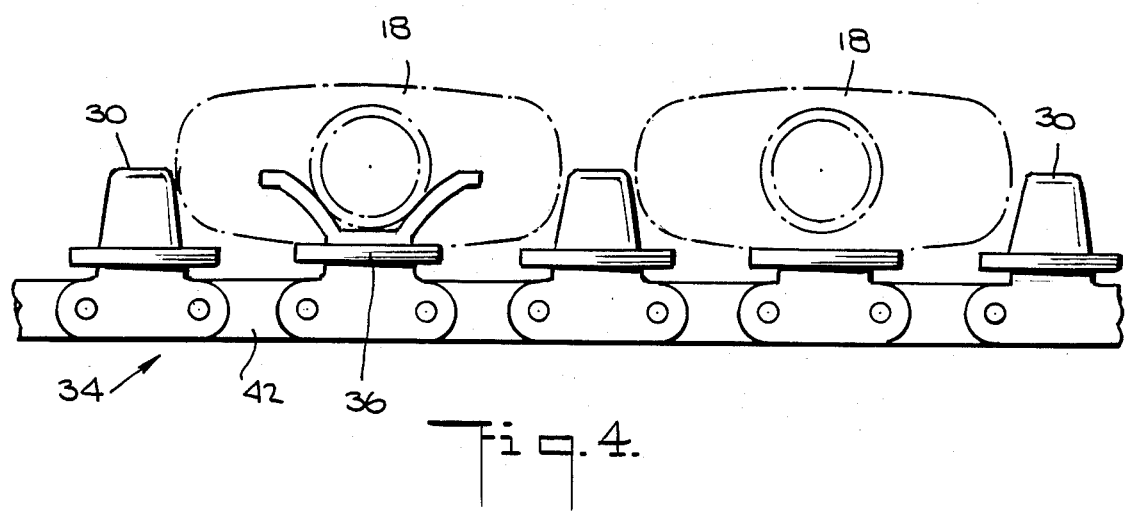
FIG. 4 is a side elevational view of a flighted transfer conveyor for supporting the containers in the horizontal position.
Figure 5:
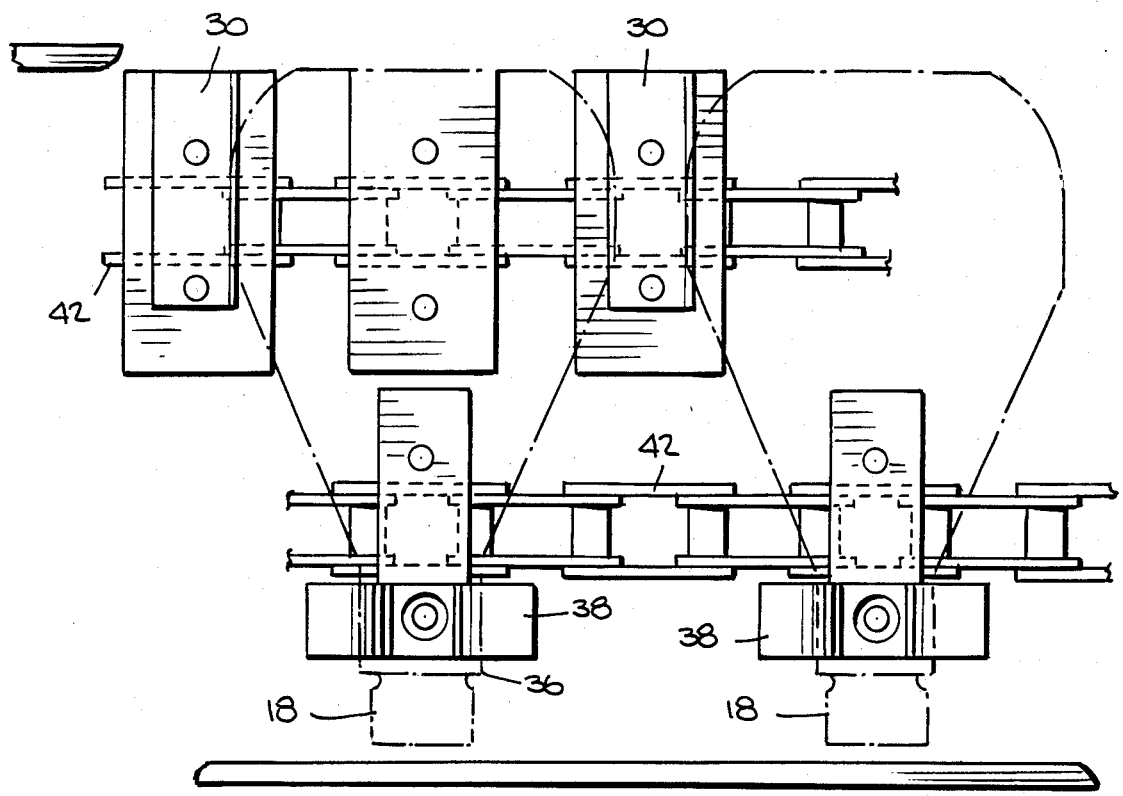
FIG. 5 is a plan view corresponding to FIG. 4.

As best shown in FIGS. 2 and 3 each of the entry, transfer, and neck conveyor segments 24, 26, 30, 32, and 36 are mounted for movement in the conveying direction by suitable brackets 40 affixing them to the spaced chain conveyors 42. The conveyor chains are carried over sprockets 44 mounted on a suitable driveshaft 46 in a known manner.

As shown in FIG. 1–3 the transfer conveyor also includes a neck engaging guide 48 for guiding each moving container from vertical to horizontal orientation so that the container is effectively transferred laterally from its entry conveyor member to the body support conveyor and the neck support conveyor. It is to be understood, of course, that each segment of the transfer conveyor moves in spaced and timed relation with the carrier conveyor which carries individual container carrier mechanisms 49 as is best shown in FIGS. 1 and 2.

The container carrying conveyor 50 includes a conveyor 52 moving in timed relation with the transfer conveyor and includes spaced supporting 54 and retaining 56 rails for supporting the container carrier mechanisms 49 at their outer ends.

The container carrier mechanism includes a carrier chain 58 of double links 60 (FIG. 6) being supported in cantilever fashion along runner rails 62, 64 positioned respectively above the outer chain 66 and below the inner chain 68 runner surfaces. A pin member 70 is fixed to the chain and extends substantially the full length of the carrier mechanism 49. This carrier pin and the chain are oriented to hold the containers in horizontal position as they move throughout the container operation. An outer housing 72 is mounted for axial sliding movement and for coaxial rotary movement with respect to the pin which is stationary. The outer 72 and inner housings 74 are mounted to the internal pin by slide bearings not shown which allow sliding telescoping movement of the carrier mechanism with respect to the internal pin. Preferably the inner section 74 of the carrier housing is fitted to the pin for this sliding movement only while the outer housing 74 rotates with respect to pin and inner housing by means of a rotatable mounting at 76. An internal spring 78 retained by the coller 80 fixed to pin 72 biases the housing to the telescoped position shown in FIG. 6, right view. A cam follower 82 forms part of the carrier housing and is effective to extend the carrier member FIG. 6 right view against the internal compression spring when the cam follower rides along cam surface 84.

By this arrangement the carrier mechanism is thereby arranged for rotary movement about the axis of the carrier spindle on the stationary inner sleeve. Additionally, the carrier mechanism, by reason of its attachment to the inner sleeve through the wheel member is now capable of axial movement along the internal pin.

The container carrier mechanism includes a suitable member 86 for gripping and holding each container by its neck 14a. Preferably the gripping member is an open ended collet 88 fitted to the end of the outer housing 72. The collet 88 (FIG. 7) is generally cylindrical with the cylindrical wall being divided into several segments 90 preferably three by means of slits 92 extending from the open end of the collar to a point intermediate to the cylindrical wall. The three segments acting together will "snap over" the container's neck and support the container. The inner contour 94 of the collet engages the exterior contour 96 of the container neck 14a. A suitable elastic collet 98 member encircles the collar for urging the segments into operative neck engaging position.

Figure 6:
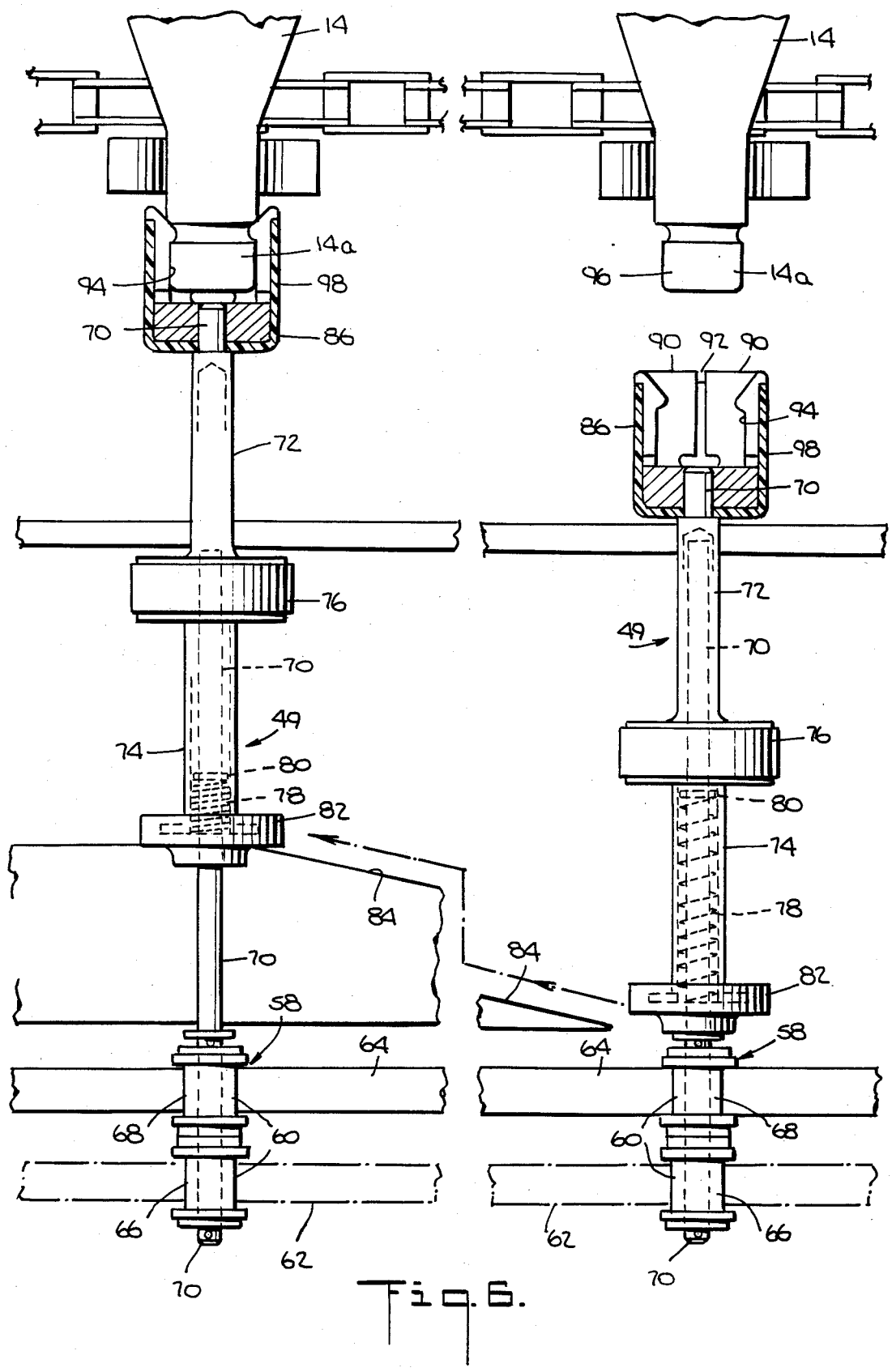
FIG. 6 is a plan view illustrating the sequential movement of the carrier conveyor and carrier mechanisms as they engage containers on the transfer conveyor.

The operation of the carrier member is shown in sequence in FIG. 6 in which in the right hand view the carrying chain is supported by the over (62) and under (64) cantilever supporting rails. It is to be understood that the pins are mounted in spaced relationship on a continuous and endless carrier chain having parallel chain extensions. The internal support pin 70 is mounted through the hub of each chain link and extends internally substantially the full length of the outer carrier housing. The free end of the carrier member is supported in sliding or rolling friction by a supporting rail. For loading containers, the carrier mechanism engages cam surface 84 and extends the carrier housing in an axial direction against the compression force of an internal spring. As the carrier gripping head and bottle are moving in timed relation and in registry with one another, the gripping head engages and secures the individual containers shown at the left hand side of FIG. 7. It will be observed that the engagement of the carrier collet 88 with the shoulder 14G of the container is sufficient to maintain the chuck in extended position so that it can successfully negotiate a gap 100 between cam members 84 and 85 best shown in FIG. 1. If desired, a hold down belt of the type used in connection with the embodiment of FIG. 8 may be used to retain the containers. As noted above carrier members not engaging a container do not have this retaining engagement and consequently the carrier mechanism will be retracted by the force of its internal spring 78 through the cam gap and follow a separate path behind the slotted coater wall to prevent the gripping head 86 to be sprayed with coating and thereby fouling the collet 88.

FIG. 8 shows a modified embodiment of the present invention for handling cylindrical containers 14. Generally, the transfer conveyor 110 includes spaced endless chain members 112 driven in a suitable manner and carrying a series of V-blocks 114 for receiving containers from an overhead feeder chute 116. Each V-block has a base portion 118 and an upwardly opening through 120 having sloped intersecting side walls 112 in V-form to receive and support a cylindrical container as shown. The front face 124 of each V-block is notched at 126 to receive the neck of each container behind its neck ring 14c. The neck ring serves as a reference surface for aligning the carrier mechanisms. The notch cooperates with the neck ring 14c and the shoulder 14d of the container to restrain the container against movement along the container's longitudinal axis while reposing in the V-block. As shown in FIG. 8, the carrier mechanisms move toward the bottles and grip them by their necks and carry them forward to subsequent container operations.

An endless overhead belt 128 driven at line speed engages and restrains the containers against rising out of the V-blocks after engagement by the carrier mechanisms 49. This restraining action is especially needed while the carrier mechanism is crossing the cam gap 100.

It will be apparent to those skilled in the art that various modifications can be made in the container transfer system without departing from the scope or spirit of the invention.

We claim:

1. A container carrying mechanism for containers having neck and body portions and a longitudinal axis, comprising an endless transfer conveyor for receiving and holding the containers in a substantially horizontal position and moving the containers along a longitudinal path, the transfer conveyor having a plurality of container receiving segments for receiving and for supporting the containers with necks of the containers oriented in a common direction, the transfer conveyor having means for engaging and supporting the neck of each container and for restraining the container against moving in an axial direction prior to removal of the container therefrom, an endless carrier conveyor for moving in spaced relation to the transfer conveyor, a plurality of support members extending laterally of the carrier conveyor with each support member having a carrier member, each of said carrier members having means for engaging and carrying containers by their necks, means for moving the support members and the carrier members laterally toward the transfer conveyor to grip individual containers by the neck, said carrier members move the containers along the same longitudinal path and means for moving the container receiving segments away from the containers and said longitudinal path whereby the containers are separated from the transfer conveyor and carried by the support members to one or more container operations.

2. A container conveying mechanism as defined in claim 1 which further comprises an entry conveyor for receiving containers from the supplying means in vertical orientation, a body support conveyor, and a neck support conveyor; said body support and neck support conveyors cooperating to hold containers in substantially horizontal orientation; and means for guiding containers from the vertical to horizontal orientation.

3. A container conveyor mechanism as defined in claim 2 in which the guiding means moves the containers laterally away from the entry conveyor as they are being reoriented.

4. A container carrier mechanism as defined in claim 1 in which the container receiving segments cooperate with the neck portion of the containers in restraining bottle movement in an axial direction.

5. A container carrier mechanism as defined in claim 4 in which the container receiving segments have a trough for receiving containers and a notched front wall member for engaging containers and restraining container movement.

6. A container carrying mechanism for containers having neck and body portions, a longitudinal axis, and a neck ring, comprising means for supplying containers, a transfer conveyor for receiving and holding the containers in a substantially horizontal position and moving the containers along a longitudinal path, the transfer conveyor having a plurality of container receiving segments for receiving and supporting the containers with necks of the containers oriented in a common direction, the transfer conveyor having means for engaging and supporting the neck of each container and for restraining the container against moving in at least one axial direction, means for engaging the sidewalls of the containers for holding them in the segments, an endless carrier conveyor for moving in spaced relation to the transfer conveyor, a plurality of support members extending laterally of the carrier conveyor with each support member having a carrier member for engaging and carrying containers by their necks, means for moving the support members laterally toward the transfer conveyor to grip the containers by their necks, the carrier members move the containers along the same longitudinal path and means for moving the container receiving segments away from the containers and said longitudinal path whereby the containers are separated from the transfer conveyor and carried to subsequent container operations as the carrier and transfer conveyors follow separate paths.

7. A container carrying mechanism as defined in claim 6 in which the container receiving segments have V-shaped troughs for receiving cylindrical containers.

8. A container conveying mechanism as defined in claim 7 in which the container receiving segments have a front wall with a notch therein to receive containers with the front wall notch engaging the containers between the neck ring and the container shoulder.

9. A container conveying mechanism as defined in claim 6 in which the side wall engaging means comprises an overhead endless belt member moving at transfer conveyor speed for engaging the sidewalls of the containers.

10. A container conveying mechanism as defined in claims 1 or 6 in which the transfer conveyor and the carrier conveyor travel in timed and spaced relationship to one another.

* * * * *